(12) United States Patent
Nair et al.

(10) Patent No.: US 11,284,171 B1
(45) Date of Patent: Mar. 22, 2022

(54) AUTOMATED AND GUIDED VIDEO CONTENT EXPLORATION AND DISCOVERY

(71) Applicant: Amazon Technologies, Inc., Seattle, WA (US)

(72) Inventors: Naveen Sudhakaran Nair, Issaquah, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/796,119

(22) Filed: Feb. 20, 2020

(51) Int. Cl.
*H04N 21/85* (2011.01)
*H04N 21/8549* (2011.01)
*H04N 21/84* (2011.01)
*H04N 21/258* (2011.01)

(52) U.S. Cl.
CPC ... *H04N 21/8549* (2013.01); *H04N 21/25891* (2013.01); *H04N 21/84* (2013.01)

(58) Field of Classification Search
CPC ......... H04N 21/8549; H04N 21/25891; H04N 21/84
See application file for complete search history.

(56) References Cited

U.S. PATENT DOCUMENTS

| | | | | |
|---|---|---|---|---|
| 2010/0106703 | A1* | 4/2010 | Cramer | G06F 16/9535 707/706 |
| 2011/0289534 | A1* | 11/2011 | Jordan | H04N 21/43615 725/48 |
| 2016/0012055 | A1* | 1/2016 | Bai | G06F 16/24578 707/734 |
| 2016/0014461 | A1* | 1/2016 | Leech | H04N 21/4312 725/14 |
| 2018/0196879 | A1* | 7/2018 | Lev | G06F 16/9535 |

* cited by examiner

*Primary Examiner* — Girumsew Wendmagegn
(74) *Attorney, Agent, or Firm* — Kilpatrick Townsend & Stockton LLP

(57) ABSTRACT

Techniques for generating an automated guide for exploring content of a content streaming platform based on inferred intent are described herein. For example, click stream data from interactions with a content streaming platform during a session, along with historical click stream data of historical interactions with the content streaming platform during historical sessions may be obtained. A score for each piece of content from a plurality of content offered by the content streaming platform may be determined based on the click stream data and the historical click stream data. The plurality of content may be ranked based on the associated scores for each piece of content. Media content may be generated that includes a portion of an associated trailer from a subset of the ranked plurality of content based on the score for each piece of content of the subset. The media content may be presented via a user interface.

17 Claims, 8 Drawing Sheets

AUTOMATED AND GUIDED VIDEO CONTENT EXPLORATION AND DISCOVERY

BACKGROUND

Streaming content providers can enable users to explore, interact with, and consume a variety of digital media (e.g., movies, TV series, documentaries, music, live video game streaming content, etc.), and thereby enjoy a plethora of content from the comfort of their own homes or while on the move. Users may be inundated with such a large variety of choices between media titles, which may result in frustration and wasted time as a user browses or searches for content to watch. Conventional streaming content providers may provide static or generic recommendations to users as they interact with a streaming platform. However, these recommendations may not be personalized to the user and may add to a user's frustration. The generic recommendations may serve as something else the user must browse in order to find the content for which they are looking.

BRIEF DESCRIPTION OF THE DRAWINGS

Various embodiments in accordance with the present disclosure will be described with reference to the drawings, in which.

DETAILED DESCRIPTION

Figure 1:
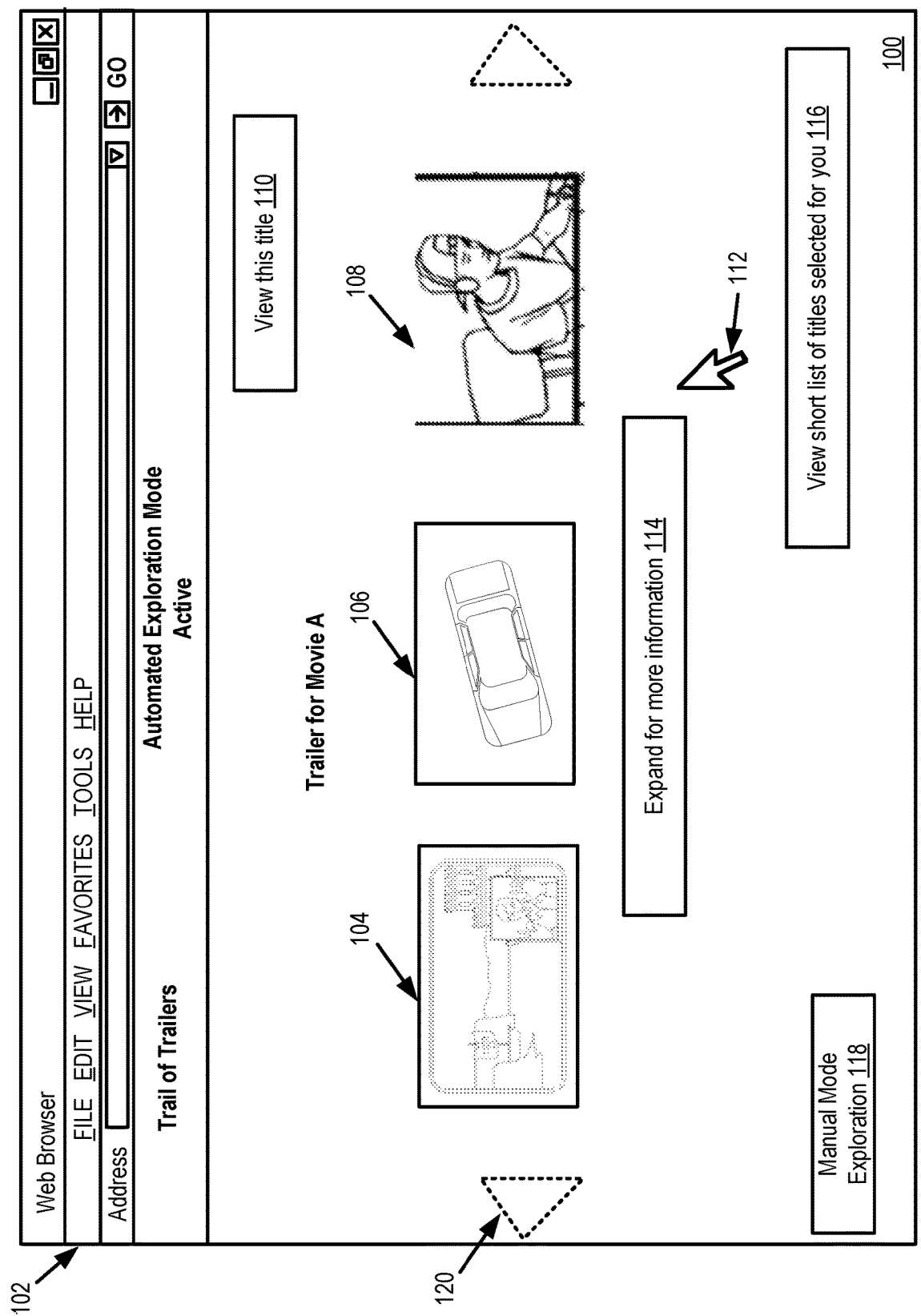
FIG. 1 illustrates an example user interface for presenting media content generated by a content exploration feature in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for implementation of a content exploration feature that generates an automated guide for exploring content of a content streaming platform based on inferred intent of a user during a session. For example, service provider computers implementing the content exploration feature may use click stream data of interactions with a content streaming platform and other information associated with a user and a viewing session(s) of the content streaming platform to train a machine learning algorithm or neural network. The trained machine learning algorithm or neural network may be configured to generate scores for content which represent a probability that a user will view or consume the content in a current session. The service provider computers may rank the content according to their associated scores and generate media content. The generated media content may be configured to present a portion of an associated trailer for a particular piece of content to guide the user into a selection during the exploration session with the content streaming platform. The service provider computers may be configured to extract or otherwise obtain click stream data from a current session of a user interacting with a content streaming platform. The click stream data can be used by the trained machine learning algorithm or neural network to generate the media content. This media content can then be presented in an automated fashion as opposed to requiring a user to manually explore the content offered by the content streaming platform.

In a non-limiting example, a user may log in to a session with a content streaming platform. During the session a user may search through, explore, or otherwise interact with various content offered by the content streaming platform. The interactions with the content streaming platform may provide click stream data which can be utilized by the service provider computers and machine learning algorithm or neural network to infer the intent of the user (e.g., which particular piece of content, genre of content, or type of content is the user actually interested in viewing during this session). In embodiments, the service provider computers may generate scores for the content offered by the content streaming platform which represent the propensity or probability that the user will view or consume the content selected by the content exploration feature. The content may then be ranked according to their respective scores and this ranked set of content may be used to generate media content. For example, each piece of content of the content streaming platform may have an associated trailer (e.g., a portion or snippet of the content that is of a duration less than the entire duration of the content). Media content can then be generated that includes a plurality of associated trailers from a subset of the ranked set of content. This media content can then be presented to the user in an automated exploration mode.

For example, a user may browse various crime genre content items of a video streaming service (e.g., the content streaming platform). In some examples, service provider computers that implement the content streaming platform may identify a set of content of the crime genre, generate scores for the set of content, rank the set of content using the associated scores, and generate a or media content. The media content (e.g., generated data object) may include a combination of associated trailers from a subset of the ranked set of content such that a user is presented with a combination of trailers. The media content can be presented in an automated exploration mode such that the user can explore content which they are interested in during a session. The media content can be generated based on their inferred intent and be guided by the service provider computers to one or more titles which they may be interested in viewing or consuming during the session. A user can interact with the media content at any point during the presentation of the or media content to start watching or consuming a particular piece of content associated with a certain trailer, find out more information about the particular piece of content, or go back to a manual exploration mode of the content. The additional interactions by the user with the generated or media content may serve as additional information that can be used to further train the machine learning algorithm or neural network for future session as well as dynamically update the or media content for the current session to include different content or update the scoring of the content.

In some examples, to "infer intent" of a user interacting with a content streaming platform is to determine a probability that a user will select one or more pieces of content offered by the content streaming platform. The service provider computers may infer the intent of a user based on the click stream data of a user during a session with the content streaming platform. Click stream data that identifies a user's previous interactions with a content streaming platform may form a certain path that can lead to a certain destination (e.g., particular piece of content). For example, a user's exploration of content associated with period pieces may result in the viewing of a television miniseries about an English manor and the associated staff from the early nineteen hundreds. In embodiments, the score determined by the service provider computers implementing the content exploration module represent the inferred intent or serve as an inferred intent score as the scores represent the probability that the user will select (e.g., view or consume) a particular piece of content (e.g., based at least in part on their click stream data and other information as described herein). In some examples, "click stream data" is generated based at least in part on any action performed or input provided by a user interacting with a content streaming platform and/or user device and associated components of the user device presenting the content streaming platform. For example, click stream data may include obtained input of a mouse device hover within a user interface presenting content of a content streaming platform on a laptop or desktop. As another example, click stream data may include input provided via associated controllers, remotes, or associated devices such as a speech-to-text device, as well as touch or gesture input. A user may interact with a piece of content to consume a movie, read a synopsis of a movie, view ratings for a movie, and/or view a trailer for the content.

In some examples a "trailer" may include any portion of content (e.g., a snippet or an edited, but shorter, version of the content) that is of a duration that is less than the entire duration of the content. In some embodiments, content may have an associated trailer such as a movie trailer that is generated/edited by the content creator of the content. In some embodiments, the associated trailer may be generated by the service provider computers implementing the content exploration feature. In embodiments, the trailer may include a portion of an associated trailer from any part of the content (e.g., the beginning, the middle, the end, etc.). In some examples "media content" may include a data object that is generated by the service provider computers and includes one or more portions of associated trailers from content offered or associated with a content streaming platform. The media content may include pointers or references to pre-generated associated trailers which include a duration of each trailer to include in the media content for each piece of content that is to be presented to the user in an automated exploration mode. In embodiments, an automated exploration mode may include an automated presentation of the generated media content and associated trailers for the pieces of content included in the generated media content via a user interface of a user device associated with a user. The automated exploration mode may aid a user in identifying a particular piece of content for viewing or consumption by automatically presenting various options to the user without the user having to provide input to explore or content offered by the content streaming platform. The automated exploration mode may represent the presentation of a curated and personalized set of content included in the generated media content that includes associated trailers for each piece of content of the personalized set of content that the service provider computers determine that the user may interested based on their click stream data and other information. An automated exploration mode may differ from a manual exploration mode in that during a manual exploration mode the user interface presenting the content offerings of a content streaming platform is passive and only presents information at the direction of the user via input provided by the user. A manual exploration mode may, in embodiments, not collate all associated information or related media for a piece of content for easy viewing and exploration as is provided during the automated exploration mode and presentation of the media content as described herein.

In accordance with at least one embodiment, the service provider computers may train and utilize a machine learning algorithm or neural network using click stream data from a plurality of users during historical sessions with the content streaming platform. For example, the training data of the click stream data may include content that users searched for or explored during a given historical session (e.g., prior to a current viewing session by a user), content that users actually viewed or consumed during a certain time period of historical sessions such as the content viewed or consumed during prior days, weeks, or months, as well as other information associated with the users or the historical sessions. In embodiments, the other information may include a period of time of the historical sessions such as a time of day, a day of the week, weekend versus weekday, time of the month, or associated seasons such as Christmas or Thanksgiving. Information associated with the user may also be utilized as training data such as demographic information including geographic location, purchases via an associated electronic marketplace, age, etc. In embodiments, a user profile maintained on behalf of a user by the service provider computers may include the information indicated above (e.g., content searched for or explored during a historical session, content viewed or consumed during certain time periods, period or seasonal time information, user demographics, etc.). In accordance with at least one embodiment, the service provider computers may determine a score for each piece of content of a set of content based on the user profile, the click stream data, and the historical click stream data. The user profile may include the user's user profile and the historical click stream data may include user profiles from the plurality of users who provided the historical click stream data. In embodiments, the service provider computer may obtain historical click stream data from a corpus of users who have interacted with the streaming content platform or a subset of users whose user profiles are similar to a current user's user profile. Similarity between user profiles may be based on content explored, searched, consumed, items purchased, reviews provided, or any number of suitable matches in information associated with both user profiles. In embodiment, the generated media content that is configured to present an automated exploration mode to the user via a user interface of a user device may include one or more features. For example, a user may provide input to view a particular title or piece of content associated with a currently viewed trailer, find out more information about the particular title or piece of content such as a synopsis, revert back to a manual exploration mode of the content offered by a content streaming platform, or view a short list of content (e.g., a certain number of content from the ranked set of content from which the associated trailers are derived from during creation of the media content).

In accordance with at least one embodiment, a user may be prompted, via the user interface and upon instructions provided by the service provider computer, to switch from a manual exploration mode to an automated exploration mode upon generating the media content including the associated trailers for a set or subset of ranked content. In embodiments, the user may also request the presentation of the media content prior to exploring or providing any click stream data in a current session with the content streaming platform. The service provider computer may generate the media content to present in the automated exploration mode for the content streaming platform. In accordance with at least one embodiment, the media content may include a data object that comprises one or more pointers to various data bases or other sources of information for the content that will populate the media content. For example, certain portions of the media content may direct a movie player to a hyperlink for playing a portion of an associated trailer, while another portion of the media content may direct a web browser or application to a synopsis or review of a particular piece of content corresponding to the associated trailer. In embodiments, the service provider computers implementing the content exploration feature may generate the media content by integrating multiple portions of media from various sources to generate new digital content. Instructions may be generated for seamlessly integrating the various portions of media to present associated trailers, related media, and other information to a user viewing the generated media content in an automated exploration mode.

The processes and systems described herein may be an improvement over conventional streaming platforms. For example, conventional streaming platforms are incapable of generating personalized recommendations that are viable for a current viewing sessions. Most conventional streaming platform recommendations rely on trending data from various users without taking into account the click stream data which led to particular viewing decisions made by users interacting with a given content streaming platform. The lack of guidance provided by conventional streaming platforms aside from generic category breakdowns of content offerings can lead to frustration and wasted time for a user as they search for something to view or consume. Systems and methods described herein use the click stream data from a current session, historical click stream data from a plurality of users during historical sessions, and other information to infer an intent of the user and generate scores for content offered by the content streaming platform. The generated scores represent a probability that a user will view or consume a particular piece of content of the plurality of content offerings from a content streaming platform during a current viewing session based on the interactions or click stream provided during the current viewing session. The generated scores can be used to generate media content which can help guide the user to content they will be interested based on their inferred intent (previous interactions and click steam data with the content streaming platform). The media content can be presented to the user in an automated exploration mode where the user can be presented trailers, related media, and associated information which may aid the user in deciding on a particular piece of content to view or consume. The content is personalized and curated based on the click stream data provided to the user such that the generated media content includes content that will not frustrate or waste the user's time while interacting with a content streaming platform.

FIG. 1 illustrates an example user interface for presenting media content generated by a content exploration feature in accordance with at least one embodiment. FIG. 1 depicts an example user interface 100 of a content exploration feature implemented by the service provider computers. The user interface 100 is presented via a web browser 102. It should be noted that although FIG. 1 depicts the user interface 100 being presented via a web browser 102, embodiments described herein include user interfaces that are presented via applications, third party applications, or native applications of a user device such as a television, a computer, a mobile phone, tablet computer, and/or video game console. The user interface 100 of FIG. 1 depicts a presentation of generated media content in an automated exploration mode. The generated media content may be referred to as a combination of trailers. For example, given a context of a content streaming platform that offers a variety of digital movies, television series, documentaries, etc., the generated media content may include a portion of a trailer from a subset of ranked movies offered by the content streaming platform.

As described herein, the user interface 100 presenting the features of the generated media content may be based on click stream data obtained from a user interacting with a content streaming platform. As an illustrative example, the generation and presentation of the features of the generated media content of user interface 100 may be based on a user interacting with the user interface 100 associated with a content streaming platform such as by searching or exploring through various movies or television series offered by the content streaming platform. The service provider computers implementing the content exploration features may utilize the click stream data provided by a user, along with historical click stream data, and other information or data to infer the intent of the user during a session with the content streaming platform. The media content may be generated based on a machine learning algorithm or neural network scoring each piece of content using the click stream data provided by a user, along with historical click stream data, and other information. The score for each piece of content may represent a probability or likelihood that the user will view or otherwise consume the content in this session. The scored content may be ranked according to their associated scores. The media content may include associated trailers for a subset of the ranked content offered by the content streaming platform. The user interface 100 of FIG. 1 depicts presentation of one associated trailer for a piece of content of the subset of ranked content according to a content exploration feature.

The user interface 100 may be configured to present the generated media content which may include various features including a portion of a trailer for a piece of content of a subset of ranked content offered by a content streaming platform. As depicted in FIG. 1, the user interface 100 presents various scenes 104, 106, 108 from a trailer for a movie. Other features of the generated media content include an option to begin viewing or consuming 110 the particular piece of content associated with a trailer being presented via user interface 100. A user may utilize input, such as via a mouse pointer 112, to interact with the user interface 100. In some embodiments, a user may provide audio input that is mapped or translated to commands such as "watch this movie," or "switch back to manual mode." The user interface 100 also includes a feature to expand or retrieve additional information 114 about a current piece of content that corresponds to the associated trailer being presented (e.g., "Trailer for Movie A"). The additional information 114 may include a synopsis for the movie, cast information, reviews, links to related media such as cast interviews or news, or recommendations for similar content or titles. The user interface 100 presenting the generated media content may include a feature for viewing a short list of titles selected for a user 116. In embodiments, a short list of titles or content may be comprised of the titles or content of the subset of content. The short list of titles or content may be a portion, some, or all of the subset of ranked content determined by the service provider computers implementing the content exploration feature.

The user interface 100 presenting the media content may include a feature for reverting back to manual mode exploration 118. When a user reverts or switches back to manual mode exploration 118 the user interface may cease presenting the media content and revert or switch back to a manual or default exploration mode for the content streaming platform. The manual exploration mode for a content streaming platform may not present generated media content automatically and instead may operate in a passive fashion that only presents content based on input provided by a user. For example, during manual exploration mode a user may be required to actively provide input to view trailers, select content, explore more than one piece of content, or search for content. The user interface 100 of FIG. 1 depicts a feature for interacting 120 with the generated media content to explore the content of the subset of ranked content associated with the generated media content. For example, the user can interact 120 with the generated media content presented via user interface 100 to explore the associated trailers at a different pace than a pace set by the content streaming platform, service provider computers, or user interface. A user may wish to interact 120 with the generated media content presented via user interface 100 to re-watch an associated trailer or go back to a specific title or piece of content and request more information 114. In accordance with at least one embodiment, the service provider computers implementing the content exploration feature may receive or otherwise obtain input provided by a user (updated click stream data) as they interact or don't interact with the generated media content presented via the user interface 100. The updated click stream data may be utilized to further train the implemented machine learning algorithms or neural network as well as update the scores for content, update the ranking of the subset of content according to updated scores, and update the generated media content to include new or different associated trailers to aid a user in exploring the content offered by a content streaming platform.

Figure 2:
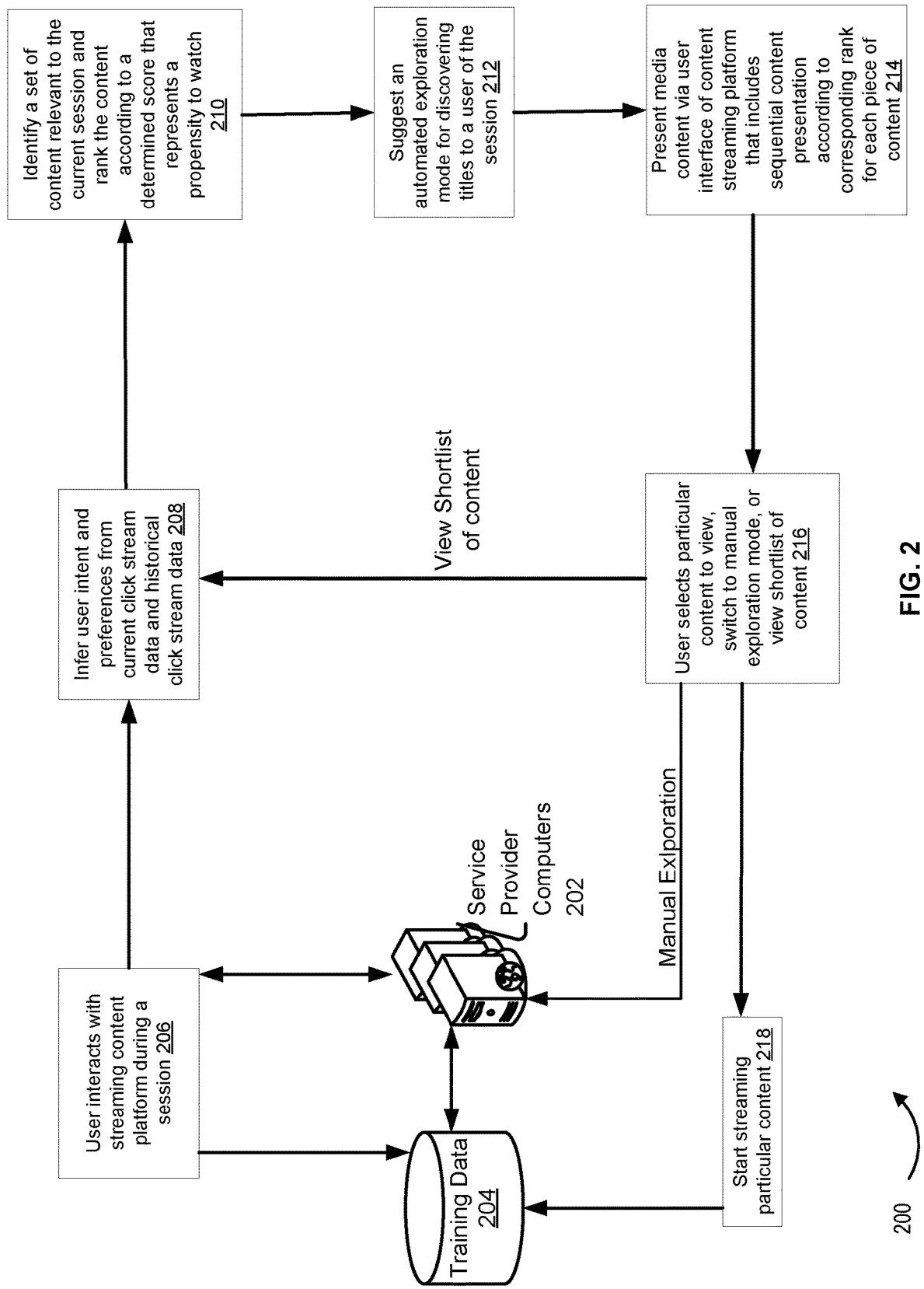
FIG. 2 illustrates an example workflow for a content exploration feature in accordance with at least one embodiment.

FIG. 2 illustrates an example workflow for a content exploration feature in accordance with at least one embodiment. The workflow 200 of FIG. 2 depicts a service provider computers 202 in communication with training data database 204. The workflow 200 includes a user interacting with streaming content platform during a session at 206. It should be noted that the interactions depicted in FIG. 2 include actions, analysis, receiving, obtaining, and transmitting, by the service provider computers 202, training data database 204, a user interface of a user device (not pictured), and a content streaming platform (not pictured) associated with the service provider computers or in communication with the service provider computers via one or more available networks such as the Internet. In embodiments, prior to a user interacting with the streaming content platform during a session at 206, the user may have logged in or otherwise provided information which may be used by the service provider computers 202 to identify a user profile associated with the user.

The workflow 200 includes inferring user intent and preferences from current click stream data and historical click stream data at 208. The current click stream data may be from the current session associated with the user interacting with the streaming content platform 206, and the historical click stream data may be derived from a plurality of users interacting with the streaming content platform during a plurality of historical sessions. The workflow 200 may include identifying a set of content relevant to the current session and ranking the content according to a determined score that represents a propensity to watch or consume at 210. In accordance with at least one embodiment, the service provider computers implementing the content exploration feature may utilize an implemented and trained machine learning algorithm or neural network to score content, rank the content according to their associated scores, and select a subset of the ranked content. As described herein, the machine learning algorithm or neural network may be trained using the historical click stream data, additional information (e.g., time of day, time of week, seasonal information, items purchased), and click stream data. The trained machine learning algorithm or neural network may be utilized to generate the scores for content offered by a content streaming platform that represent a propensity of the user to watch or consume the content given their interactions (current click stream data) and other information. In embodiments, the content may be ranked according to their corresponding scores. The set or subset of ranked content may be selected based on the associated scores and a threshold. For example, generated media content may include a top five ranked movies according to their scores that exceed a certain threshold. In accordance with at least one embodiments, the service provider computers may increment or dynamically update the threshold based on the generated scores for the content given the data (click stream data, historical click stream data, and/or other information) for a session. The same user in different sessions may be presented with different media content using different scores and a different threshold based on the click stream data provided during a given session with the content streaming platform.

The workflow 200 includes suggesting an automated exploration mode for discovering titles to a user of the session at 212. In accordance with at least one embodiment, the service provider computers 202 implementing the content exploration feature may generate and transmit a prompt that can be presented via a user interface to a user for presenting the generated media content via an automated exploration mode. In embodiments, the user interface may present the generated media content upon receiving affirmation or input from the user indicating their desire to view the generated media content. The input from the user, via the user interface, may be transmitted to the service provider computers 202 which may result in the service provider computers 202 transmitting the generated media content to the user device and associated user interface for presentation to the user. In embodiments, service provider computers 202 may generate and transmit the media content or for presentation absent any prompt or input from the user. In accordance with at least one embodiment, the service provider computers 202 may generate the media content for automatic presentation to a user interacting with the streaming content platform 206 absent the user interacting with the streaming content platform 206 (e.g., not providing click stream data for a current session). In such cases, the service provider computers 202 may utilize historical click stream data from a plurality of users interacting with the streaming content platform 206. The service provider computers 202 may also utilize historical click stream data from a subset of users based on the similarity of their user profiles to a user profile if a user of a current session. In accordance with at least one embodiment, the service provider computers 202 may generate the media content for automatic presentation based at least in part on a number of interactions of the click stream data provided by a user in a current session exceeding a threshold. For example, a user may be scrolling, exploring, and discovering a variety of digital content from a number of categories offered by a streaming content platform 206. The number of interactions by the user with the streaming content platform 206 may serve as a trigger for the service provider computers 202 to generate and present the generated media content using the click stream data, historical click stream data, and user profile information as described herein. In embodiments, the service provider computers 202 may generate and present the generated media content to a user via the streaming content platform 206 after a certain period of time of inactivity. The inactivity may include situations where no click stream data is provided by the user after a certain period of time from initiation of a session or from a previous interaction with the streaming content platform during the session. The certain period of time of inactivity may be specified, updated, and maintained by the service provider computers 202, the streaming content platform 206, or the user.

The workflow 200 includes presenting the generated media content via the user interface of the content streaming platform that includes sequential content presentation according to a corresponding rank for each piece of content at 214. For example, the presentation of the generated media content may include presentation of associated trailers for each piece of content of a subset of ranked content according to the associated score of each piece of content of the subset of ranked content. The workflow 200 includes a user performing one or more actions including selecting particular content associated with the generated media content for viewing or consumption, switching to a manual exploration mode, or viewing a short list of content of the subset of ranked content at 216. Depending on the action taken by the user or the input provided by the user, the service provider computers 202 may provide additional information such as reverting or switching back to a manual exploration such as by providing instructions to the user interface, user device, or application implementing the user device. The manual exploration and streaming of particular content 218 may be transmitted as data or input to the training data database 204 for further training and updating of the machine learning algorithm or neural network.

Figure 3:
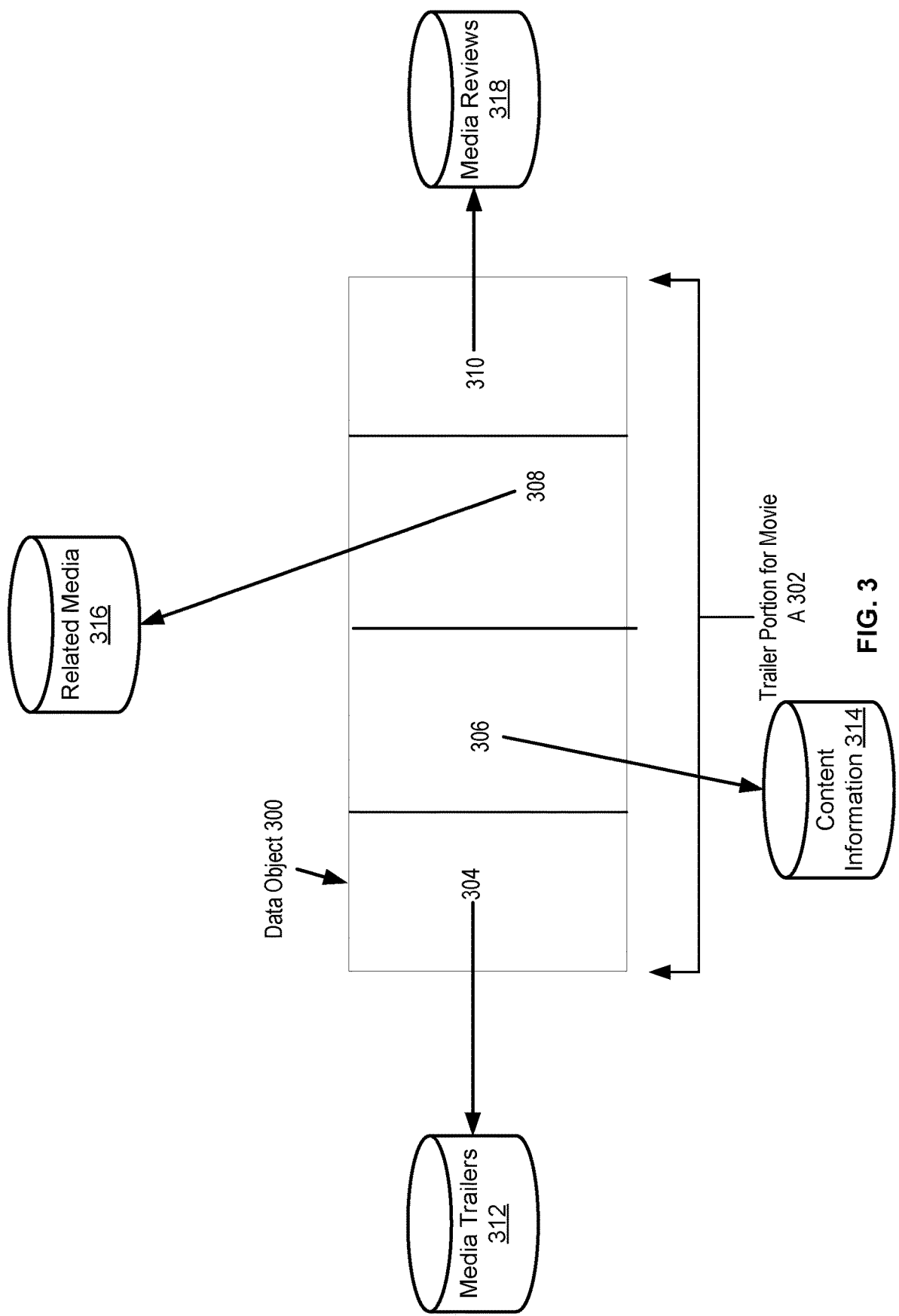
FIG. 3 illustrates an example that corresponds to media content generated by a content exploration feature in accordance with at least one embodiment.

FIG. 3 illustrates an example that corresponds to media content generated by a content exploration feature in accordance with at least one embodiment. The data object 300, which may be referred to herein as media content or generated media content, may include one or more associated trailers and other information for each piece of content of a subset of ranked content determined by the service provider computers as described herein. It should be noted that although the data object 300 of FIG. 3 depicts a trailer portion for Movie A 302, media content generated by the service provider computers may include a plurality of trailer portions for one or more movies or pieces of content such as music, video game streams, etc. In embodiments, each data object 300 may include one or more trailer portions, such as trailer portion for Movie A 302. A trailer portion such as trailer portion for Movie A 302 may include additional information besides the associated trailer.

For example, as depicted in FIG. 3, the data object 300 includes one or more pointers 304-310 to various resource information sources such as media trailers database 312, content information database 314, related media database 316, and media reviews database 318. The media trailers database 312 may include an associated trailers for each piece of content of the generated media content or data object 300 that is determined based on the corresponding scores, a threshold, and the service provider computers implementing the content exploration feature. In accordance with at least one embodiment, the service provider computer can select any portion of an associated trailer from media trailers database 312, or any portion of the associated content (e.g., content that is not normally included in a trailer for the content). In embodiments, the content information database 314 may include information associated with each piece of content of the data object 300 such as synopsis, cast information, etc. The related media database 316 may include associated media or content such as related content, recommended content, cast interviews, associated news stories, etc. The media reviews database 318 may include one or more reviews for each piece of content of the data object 300. The reviews may be provided by users, professional critics, or other entities.

In accordance with at least one embodiment, the data object 300 or generated media content may be generated by the service provider computers implementing the content exploration features and include a data structure that includes one or more pointers to various sources of information such as databases 312-318. In embodiments, the generated media content may include already retrieved and integrated media, information, related media, trailers, and reviews such that presentation of the, such as data object 300, does not require communication with further entities such as databases 312-318. In some embodiments, the generated media content or data object 300 may include a combination of pointers and already fetched or obtained media that comprises the associated trailer for a piece of content of a subset of ranked content. In embodiments, the generated media content or data object 300 may be configured to be transmitted by the service provider computers to a user device and associated user interface for presentation. The user device may utilize the pointers or hyperlinks to retrieve the required information (e.g., associated trailer) to present via the user interface the contents of the generated media content or data object 300. In embodiments, the service provider computers may retrieve the information to be included in the generated media content prior to transmitting the generated media content or data object 300 to the user device via available networks. In accordance with at least one embodiment, the service provider computers may generate and transmit instructions to the user device for integrating the various information of a data object 300 or media content for presentation via an associated user interface.

Figure 4:
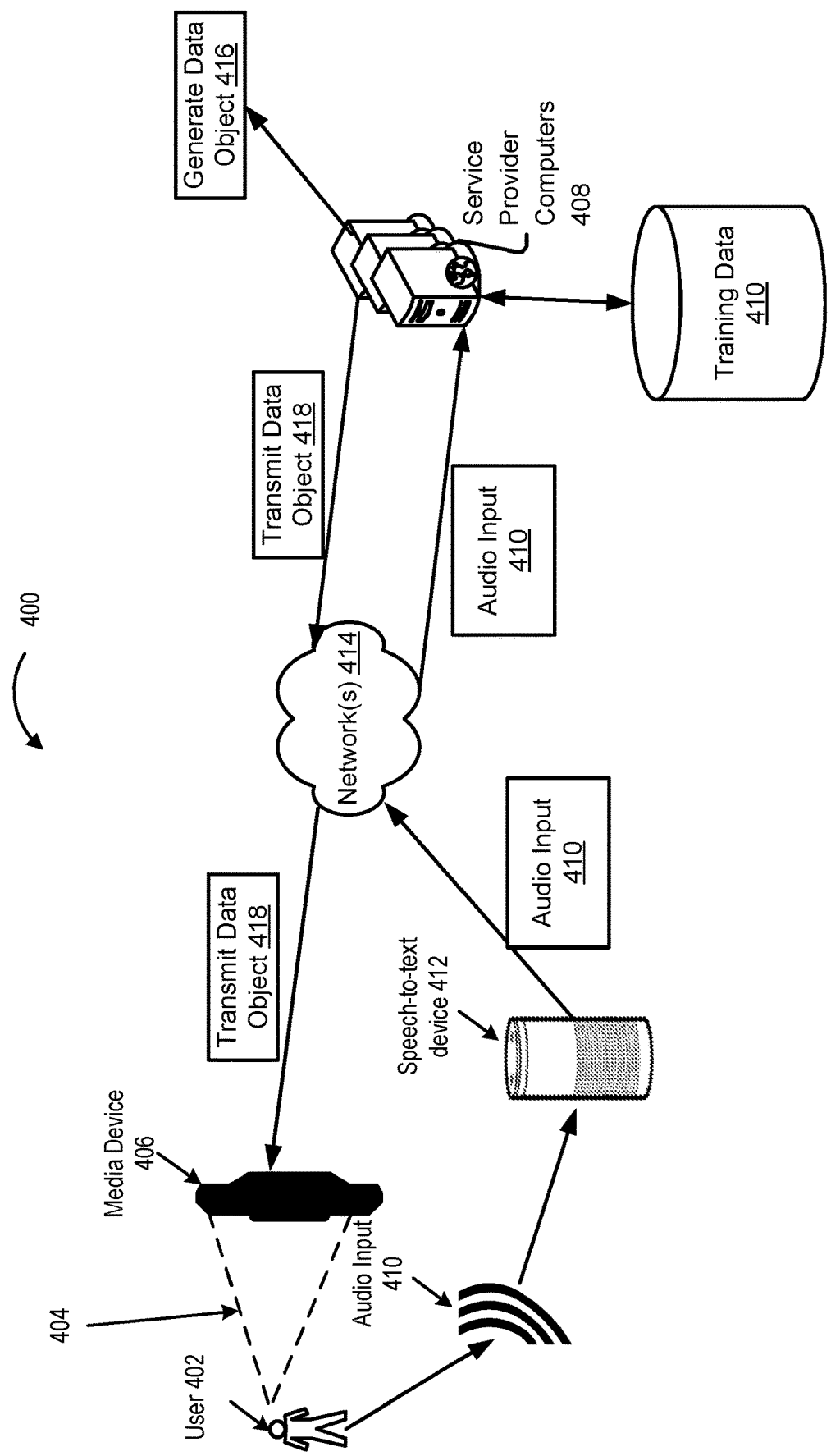
FIG. 4 illustrates an example workflow for a content exploration feature in accordance with at least one embodiment.

FIG. 4 illustrates an example workflow for a content exploration feature in accordance with at least one embodiment. FIG. 4 depicts workflow 400 which includes a user 402 interacting 404 with a media device (user device) 406 to view or consume content provided by a content streaming platform (not pictured). In embodiments, the content streaming platform may be associated with the service provider computers 408. The workflow 400 includes the service provider computers 408 in communication or accessing a training data database 410. In embodiments, the user 402 may interact 404 with the media device 406 that is associated with a user interface presenting content offered by a content streaming platform. The interaction 404 provided by user 402 may correspond to click stream data that is provided to the service provider computers 408. The user 402 may interact 404 with the user interface presented via media device 406 and the content streaming platform via associated input/output devices including a mouse, keyboard, remotes, controllers, gestures via augmented reality presentations or virtual reality presentations, etc.

FIG. 4 depicts the user 402 providing input via audio as audio input 410 that is captured by associated speech-to-text device 412 and transmitted, via networks 414, to the service provider computers 408. For example, the audio input 410 may include commands such as "start an automated exploration mode" or in response to a query to begin presenting the generated media content such as by providing a command similar to "begin presentation of the generated media content." In accordance with at least one embodiment, the service provider computers 408 may receive the audio input 410 and map or translate the input to one or more commands that can be interpreted by the service provider computers 408. As depicted in FIG. 4, the service provider computers 408 may generate a 416 in response to the audio input 410 in cases where the audio input 410 corresponds to presentation or generation of the media content or. The workflow 400 corresponds to the service provider computers 408 transmitting the data object 418, via networks 414, to the media device 406, for presentation to the user 402 via an associated user interface. In embodiments, a user 402 may provide audio input 410 to initiate presentation of the generated media content or data object 416 such that the user 402 may initiate a hands free automated exploration of personalized content offered by a content streaming platform. The user 402 may provide audio input 410 to further interact with the generated data object 416 or media content to select a particular piece of content for viewing, obtain more information, view related content, etc., without the use of other types of input via associated input/output devices.

Figure 5:
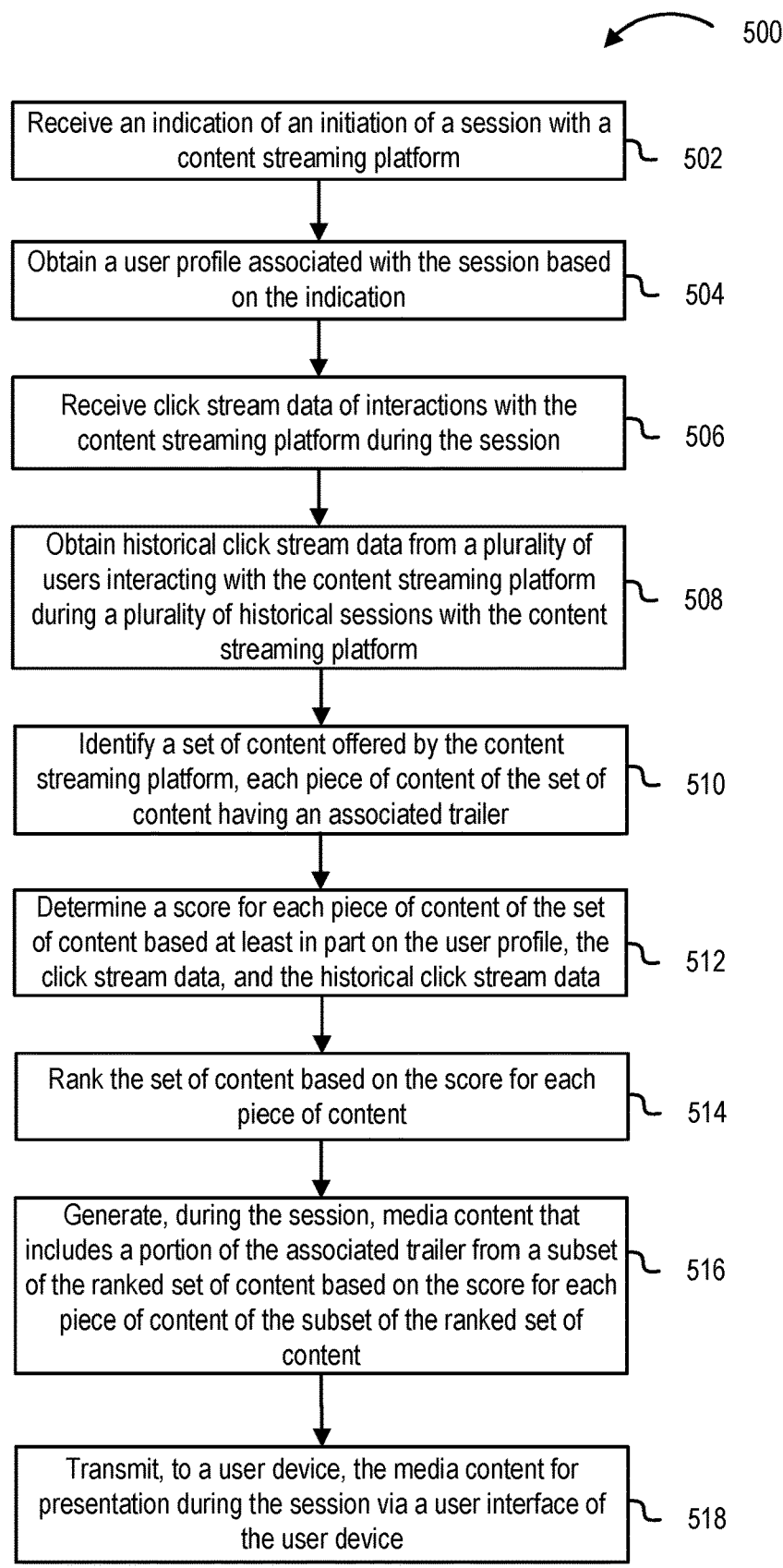
FIG. 5 illustrates a flow diagram of a process for a content exploration feature in accordance with at least one embodiment.
Figure 6:
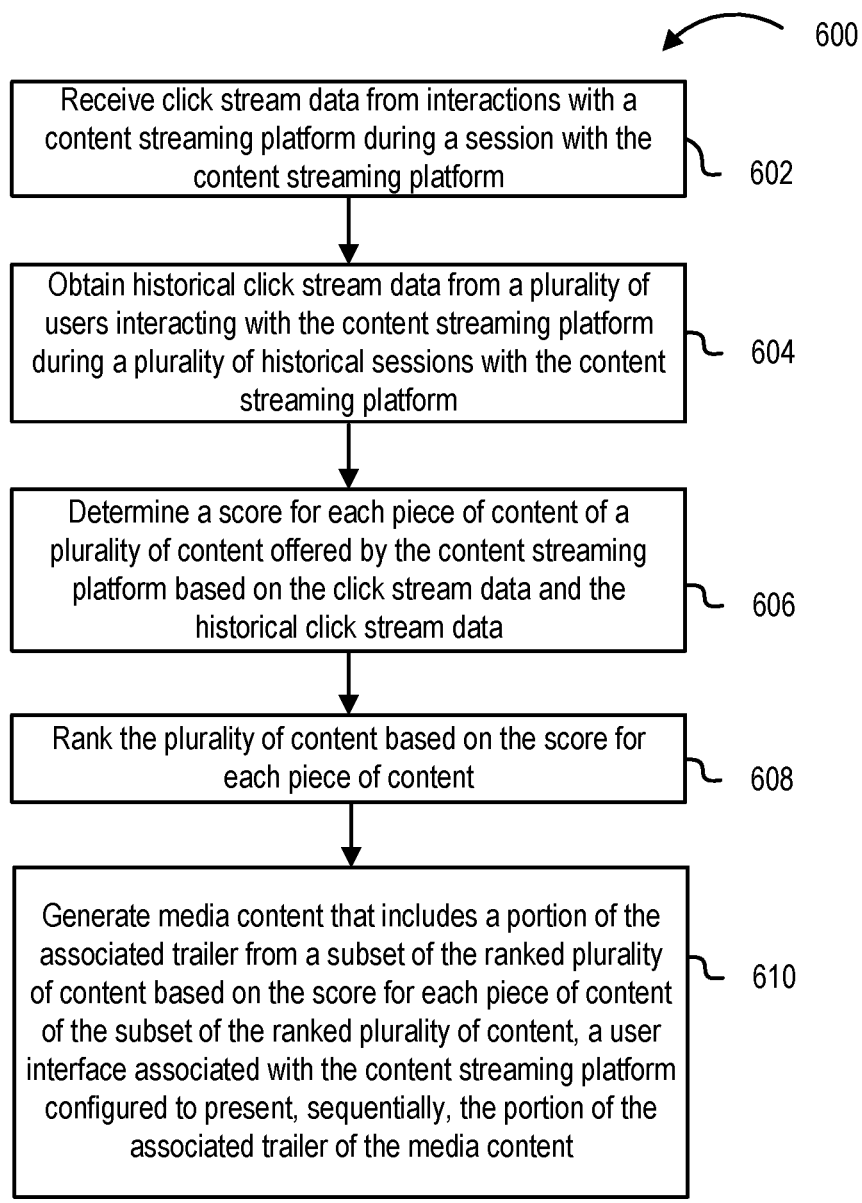
FIG. 6 illustrates a flow diagram of a process for a content exploration feature in accordance with at least one embodiment.

FIGS. 5 and 6 illustrate example flow charts for content exploration features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 7:
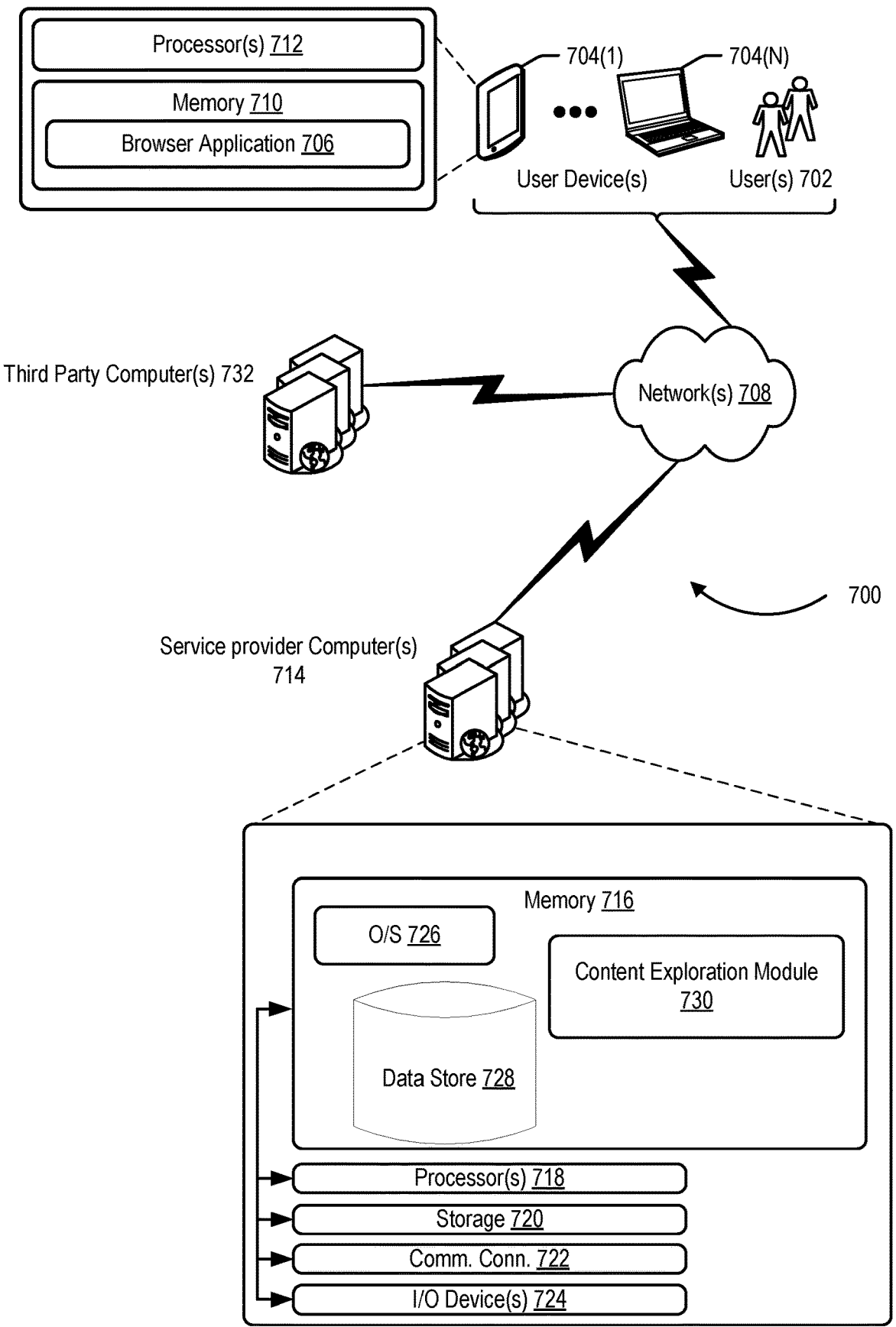
FIG. 7 illustrates an example architecture for implementing a content exploration feature as described herein that includes one or more service provider computers, a user device, and/or one or more third party computers connected via one or more networks in accordance with at least one embodiment.

In some examples, service provider computers (service provider computers 202, 408, and 714) utilizing at least the content exploration module 730 depicted in FIGS. 2, 4, and 7 may perform the processes 500 and 600 of FIGS. 5 and 6. In FIG. 5, the process 500 may include receiving an indication of an initiation of a session with a content streaming platform at 502. In embodiments, a user may log in or perform some other kind of session initiation process with a content streaming platform via a user interface and associated user device. The process 500 may include obtaining a user profile associated with the session based at least in part on the indication at 504. In accordance with at least one embodiment, the service provider computers implementing the content exploration feature may obtain, lookup, or otherwise determine a user profile associated with the initiation of the session such as by mapping a username and password of a log in session with a user profile maintained by the service provider computers. The process 500 may include receiving click stream data of interactions with the content streaming platform during the session at 506. In embodiments, as the user provides input which corresponds to interactions with the content streaming platform, such as exploring content, viewing trailers for content, etc., the corresponding click stream data is received by the service provider computers.

The process 500 may include obtaining historical click stream data from a plurality of users interacting with the content streaming platform during a plurality of historical sessions with the content streaming platform at 508. In embodiments, the service provider computers may maintain and retrieve historical click stream data for use by an implemented machine learning algorithm or neural network for inferring the intent of the user based on their click stream data. The process 500 may include identifying a set of content offered by the content streaming platform where each piece of content of the set of content has an associated trailer at 510. As described herein, the associated trailer may be any snippet or portion of a piece of content offered by the content streaming platform. The associated trailer may be a separate media file that corresponds to the piece of content or it may be generated or derived by the service provider computers. The process 500 may include determining a score for each piece of content of the set of content based at least in part on the user profile, the click stream data, and the historical click stream data at 512. In embodiments, the machine learning algorithm or neural network of the service provider computers may be trained to utilize the information of the user profile, the click stream data, and the historical click stream data to generate a score for each piece of content of the set of content. The score may represent the probability of the user in the current session viewing or consuming the content.

The process 500 may include ranking the set of content based at least in part on the score for each piece of content at 514. The process 500 may include generating, during the session, media content that includes a portion of the associated trailer from a subset of the ranked set of content based at least in part on the score for each piece of content of the subset of the ranked set of content at 516. As an illustrative example, the media content may include associated trailers for the top five scored movies of a set of scored movies for presentation to the user via a user interface of a user device interacting with the content streaming platform. In accordance with at least one embodiment, which particular scored content pieces that are selected for the media content may be based on the scores of the content pieces and a threshold. The threshold may be specified by the service provider computer or it may be dynamically incremented based on the determined scores for the set of content. The process 500 may include transmitting, to a user device, the media content for presentation during the session via a user interface of the user device at 518. As described herein, the user interface of the user device or an application of the user device with a user interface may automatically present the media content as part of an automated exploration mode or it may prompt the user for input to start presentation of the media content as part of the automated exploration mode.

The process 600 may include receiving click stream data from interactions with a content streaming platform during a session with the content streaming platform at 602. The process 600 may include obtaining historical click stream data from a plurality of users interacting with the content streaming platform during a plurality of historical sessions with the content streaming platform at 604. The process 600 may include determining a score for each piece of content of a plurality of content offered by the content streaming platform based on the click stream data and the historical click stream data at 606. The process 600 may include ranking the plurality of content based at least in part on the score for each piece of content at 608. The process 600 may include generating media content that includes a portion of the associated trailer from a subset of the ranked plurality of content based at least in part on the score for each piece of content of the subset of the ranked plurality of content at 610. In embodiments, a user interface associated with the content streaming platform is configured to present, sequentially, the portion of the associated trailer of the media content to a user of a user device associated with the user interface. In accordance with at least one embodiment, the user can provide audio input via a speech-to-text device that is configured to capture audio input and translate the audio input to commands. For example, the user may confirm presentation of the media content in response to a prompt provided via the user interface about the media content.

FIG. 7 illustrates an example architecture for implementing the content exploration feature, in accordance with at least one embodiment. In architecture 700, one or more users 702 (e.g., customers, users, consumers, etc.,) may utilize user computing devices 704(1)-(N) (collectively, user devices 704) to access a browser application 706 or a user interface (UI) accessible through the browser application 706, via one or more networks 708 to request content including digital media content or streaming content associated with a content streaming platform. In embodiments, the one or more users 702 may utilize user computing devices 704(1)-(N) to access the browser application 706 or a UI accessible through the browser application 706, via one or more networks 708, to request content including media content from third party computers 732 or service provider computers 714 associated with a content streaming platform. The one or more users 702 may utilize user computing devices 704(1)-(N) to access the browser application 706 or a UI accessible through the browser application 706, to request content, interact with content, search and/or explore content offered by a content streaming platform associated with the service provider computers 714 via one or more networks 708. The "browser application" 706 can be any browser control or native application that can access and display a network page or other information such as a user interface of a native software application for enabling the selection or interaction of content, such as media content or digital media content, and requesting or receiving s or media content that are configured to present associated trailers in an automated exploration feature for a subset of content offered by the content streaming platform. A native software application may include an application or program that has been developed for use on a particular platform (such as an operating system) or a particular device (such as a particular type of mobile device or user device 704). In embodiments, the user device 704 may include one or more components for enabling the user 702 to interact with the browser application 706. In embodiments, the user device 704 and/or the service provider computers 714 may be configured to receive audio input from one or more speech-to-text devices (not pictured) for interacting with the content presented by the browser application 706 and user device 704 and offered or generated by the service provider computers 714.

The user devices 704 may include at least one memory 710 and one or more processing units or processor(s) 712. The memory 710 may store program instructions that are loadable and executable on the processor(s) 712, as well as data generated during the execution of these programs. Depending on the configuration and type of the user devices 704, the memory 710 may be volatile (such as random access memory (RAM)) and/or non-volatile (such as read-only memory (ROM), flash memory, etc.). The user devices 704 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 704. In some implementations, the memory 710 may include multiple different types of memory, such as static random access memory (SRAM), dynamic random access memory (DRAM), or ROM.

Turning to the contents of the memory 710 in more detail, the memory 710 may include an operating system and one or more application programs or services for implementing the features disclosed herein including the content exploration module 730.

The architecture 700 may also include one or more service provider computers 714 that may, in some examples, provide computing resources such as, but not limited to, client entities, low latency data storage, durable data store, data access, management, virtualization, hosted computing environment or "cloud-based" solutions, electronic content performance management, media streaming services, content generation, etc. The service provider computers 714 may implement or be an example of the service provider computer(s) described herein with reference to FIGS. 1-6 and throughout the disclosure. The one or more service provider computers 714 may also be operable to provide site hosting, media or content streaming services, computer application development, and/or implementation platforms, combinations of the foregoing, or the like to the one or more users 702 via user devices 704 as well as receive media streaming content or generate content for the one or more users 702 via user device 704.

In some examples, the networks 708 may include any one or a combination of many different types of networks, such as cable networks, the Internet, wireless networks, cellular networks, and other private and/or public networks. While the illustrated examples represents the users 702 communicating with the service provider computers 714 over the networks 708, the described techniques may equally apply in instances where the users 702 interact with the one or more service provider computers 714 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 714 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 714 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 714 may be in communication with the user device 704 via the networks 708, or via other network connections. The one or more service provider computers 714 may include one or more servers, perhaps arranged in a cluster or as individual servers not associated with one another.

In one illustrative configuration, the one or more service provider computers 714 may include at least one memory 716 and one or more processing units or processor(s) 718. The processor(s) 718 may be implemented as appropriate in hardware, computer-executable instructions, firmware, or combination thereof. Computer-executable instruction or firmware implementations of the processor(s) 718 may include computer-executable or machine-executable instructions written in any suitable programming language to perform the various functions described when executed by a hardware computing device, such as a processor. The memory 716 may store program instructions that are loadable and executable on the processor(s) 718, as well as data generated during the execution of these programs. Depending on the configuration and type of the one or more service provider computers 714, the memory 716 may be volatile (such as RAM) and/or non-volatile (such as ROM, flash memory, etc.). The one or more service provider computers 714 or servers may also include additional storage 720, which may include removable storage and/or non-removable storage. The additional storage 720 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 616 may include multiple different types of memory, such as SRAM, DRAM, or ROM.

The memory 716, the additional storage 720, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 716 and the additional storage 720 are all examples of non-transitory computer storage media. Additional types of non-transitory computer storage media that may be present in the one or more service provider computers 714 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 714. Combinations of any of the above should also be included within the scope of non-transitory computer-readable media.

The one or more service provider computers 714 may also contain communication connection interface(s) 722 that allow the one or more service provider computers 714 to communicate with a data store, another computing device or server, user terminals, user devices, and/or other devices on the networks 708. The one or more service provider computers 714 may also include I/O device(s) 724, such as a keyboard, a mouse, a pen, a voice input device, a touch input device, a display, speakers, a printer, etc.

Turning to the contents of the memory 716 in more detail, the memory 716 may include an operating system 726, one or more data stores 728, and/or one or more application programs or services for implementing the features disclosed herein including the content exploration module 730. In accordance with at least one embodiment, the content exploration module 730 may be configured to at least generate media content that includes a portion of a trailer associated with a subset of content offered by a content streaming platform. In embodiments, the content exploration module 730 may be configured to implement a machine learning algorithm or neural network to generate scores for each piece of content and rank the content according to their corresponding scores to determine a ranked subset of the content from all the content offered by a content streaming platform. A generated score for a piece of content may represent the probability of the user viewing or otherwise consuming the content during a current session. In embodiments, the content exploration module 730 may be configured to train the machine learning algorithm or neural network using click stream data from a plurality of users interacting with the content streaming platform during a number of historical sessions.

In accordance with at least one embodiment, the content exploration module 730 may be configured to obtain click stream data from users as they interact with a content streaming platform such as by browsing or exploring for titles or content to consume during a session. The content exploration module 730 may be configured to utilize content consumed during a previous time period by a current user and a plurality of users during prior sessions with the content streaming platform to train the machine learning algorithm or neural network. The content exploration module 730 may be configured to utilize other information associated with users and sessions to train the machine learning algorithm or neural network such as a time period (e.g., time of day content is consumed, day of the week content is consumed, type of content consumed such a movie versus a series, seasons associated with sessions such as Christmas or Thanksgiving, items purchased or interacted with in an associated electronic marketplace, etc.). The content exploration module 730 can use the click stream data of a user during a current session with a content streaming platform as input or data along with the trained machine learning algorithm or neural network to infer an intent of the user and generate media content that is configured to be presented in an automated and dynamic scenario such that a user may be guided in an exploration of content offered by a content streaming platform.

The media content generated by the service provider computers 714 and the content exploration module 730 may include a portion of associated trailers for each piece of content of a subset of ranked plurality of content offered by the content streaming platform in order to guide or clarify the search and exploration session of a user during a session with the content streaming platform. The service provider computers 714 and content exploration module 730 can generate instructions for presenting the generated media content as well as instructions for generating the media content to include further information such as related media, reviews, synopsis, cast information, etc. The generated media content which includes the portions of associated trailers and additional information can further aid the exploration session of a user with the content streaming platform and decide a particular piece of content to view or consume in the session.

The architecture of FIG. 7 also includes third party computers 732 that may further include processors, memory, and a browser application similar to service provider computers 714 and user device 702. In embodiments, the third party computers 732 may be configured to transmit or otherwise provide content such as streaming content to user devices 704 and/or service provider computers 714 via networks 708. In embodiments, the third party computers 732 may be configured to transmit information such as related media or associated about the streaming content offered by a streaming content platform either associated or not associated with the service provider computers 714 to the service provider computers 714 via networks 708.

Figure 8:
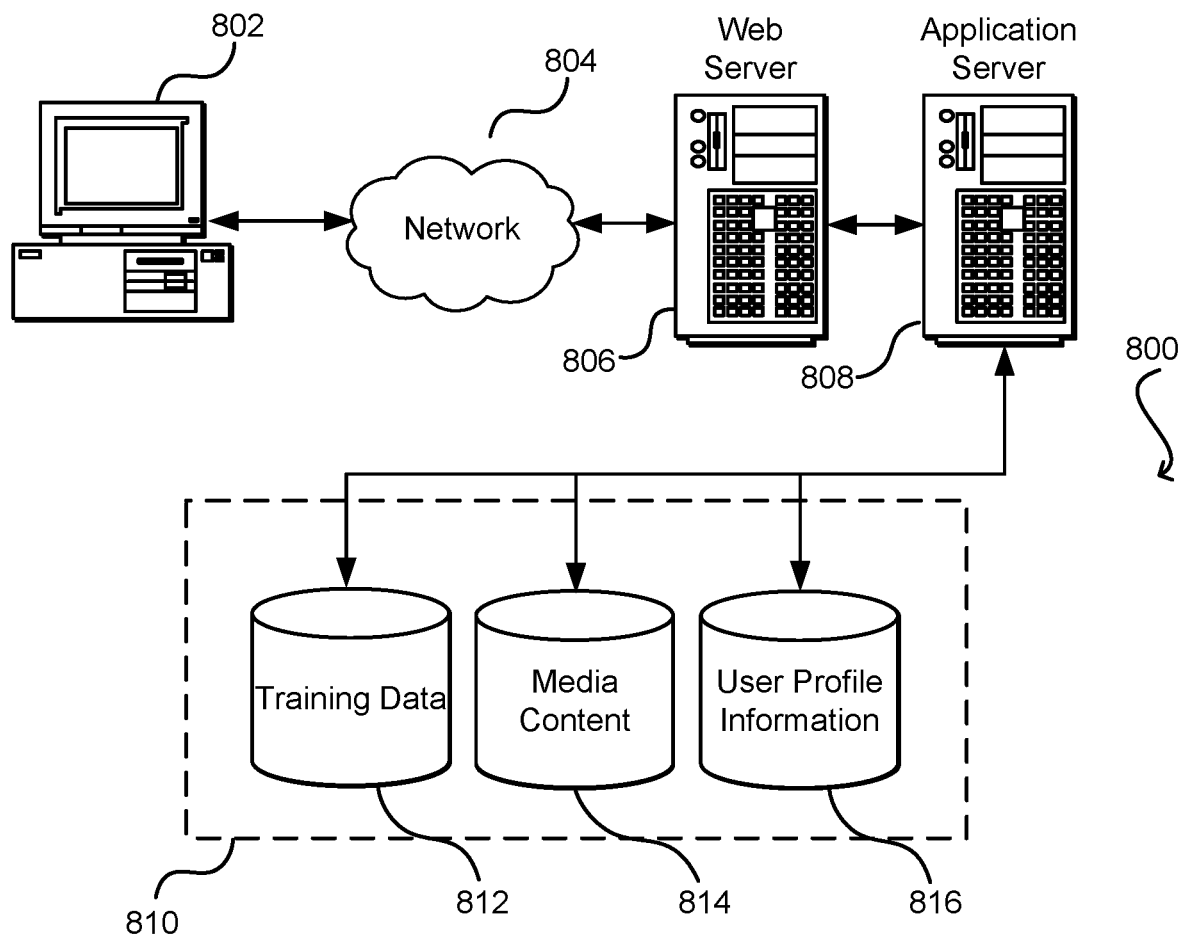
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing training data 812 and user profile information 816, which can be used to serve content for the production side as well as train an implemented machine learning algorithm or neural network in determining an intent of a user interacting with a content streaming platform. The data store also is shown to include a mechanism for storing media content 814, which can be used for reporting, analysis, or other such purposes such as generating s that include portions of media from a set of content determined based on scores associated with the content and a threshold. The media content may include a ranked set of content that can be presented, sequentially, via a user interface. The media content may include portions of each piece of content such that a portion from various media content can be presented to user in an automated exploration mode. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a computer system, an indication of an initiation of a session with a content streaming platform;
obtaining, by the computer system, a user profile associated with the session based at least in part on the indication;
receiving, by the computer system, click stream data from interactions with the content streaming platform during the session;
obtaining, by the computer system, historical click stream data from a plurality of users interacting with the content streaming platform during a plurality of historical sessions with the content streaming platform;
identifying, by the computer system, a set of content offered by the content streaming platform, each piece of content of the set of content having an associated trailer;
determining, by the computer system, a score for each piece of content of the set of content based at least in part on the user profile, the click stream data, and the historical click stream data, the score representing a probability of viewing each piece of content during the session;
ranking, by the computer system, the set of content based at least in part on the score for each piece of content;
generating, during the session, media content that includes a portion of the associated trailer from a subset of the ranked set of content based at least in part on the score for each piece of content of the subset of the ranked set of content;
determining, by the computer system, a particular portion of the associated trailer from each piece of content of the subset of the ranked set of content based at least in part on the click stream data and the historical click stream data, the particular portion being of a duration less than an entire duration of each piece of content or the associated trailer;
transmitting, by the computer system and to a user device, the media content for presentation, during the session, via a user interface of the user device, the media content including the particular portion; and
updating, by the computer system, the ranking of the set of content based at least in part on updated click stream data associated with the content streaming platform during the session, the updated click stream data being updated based at least in part on one or more of searching through the set of content, exploring the set of content, or interacting with portions of the set of content based at least in part on updated input from an input/output device associated with the user device.

2. The computer-implemented method of claim 1, wherein the user profile includes one or more of content from the set of content searched or explored via the content streaming platform in association with the user profile, a period of time that the content was searched or explored via the content streaming platform, or a season associated with searching or exploring the content via the content streaming platform.

3. The computer-implemented method of claim 1, wherein generating the media content is further based at least in part on the score and a threshold.

4. The computer-implemented method of claim 3, further comprising updating, by the computer system, the threshold based at least in part on the score for each piece of content of the subset of the ranked set of content.

5. A non-transitory computer-readable storage medium storing computer-executable instructions that, when executed by a computer system, configure the computer system to perform operations comprising:

receiving click stream data from interactions with a content streaming platform during a session with the content streaming platform;

obtaining historical click stream data from a plurality of users interacting with the content streaming platform during a plurality of historical sessions with the content streaming platform;

determining a score for each piece of content of a plurality of content offered by the content streaming platform based at least in part on the click stream data and the historical click stream data, the score representing a probability of consuming each piece of content during the session, each piece of content having an associated trailer;

ranking the plurality of content based at least in part on the score for each piece of content;

generating media content that includes a portion of the associated trailer from a subset of the ranked plurality of content based at least in part on the score for each piece of content of the subset of the ranked plurality of content, a user interface associated with the content streaming platform configured to present, sequentially, the portion of the associated trailer of the media content;

determining a particular portion of the associated trailer from each piece of content of the subset of the ranked plurality of content based at least in part on the click stream data and the historical click stream data, the particular portion being of a duration less than an entire duration of each piece of content or the associated trailer, the media content including the particular portion; and updating the ranking of the plurality of content based at least in part on updated click stream data associated with the content streaming platform during the session, the updated click stream data being updated based at least in part on one or more of searching through the plurality of content, exploring the plurality of content, or interacting with portions of the plurality of content based at least in part on input from an input/output device from a user device associated with the user interface.

6. The non-transitory computer-readable storage medium of claim 5, wherein the computer-executable instructions, when executed by the computer system, further configure the computer system to perform operations comprising transmitting instructions to update the user interface of the content streaming platform to present the media content in response to receiving input via the user interface.

7. The non-transitory computer-readable storage medium of claim 5, wherein the computer-executable instructions, when executed by the computer system, further configure the computer system to perform operations comprising updating the subset of the ranked plurality of content based at least in part on the updated click stream data with the content streaming platform during the session.

8. The non-transitory computer-readable storage medium of claim 5, wherein the media content is further configured to present information associated with the portion of the associated trailer from the subset of the ranked plurality of content.

9. The non-transitory computer-readable storage medium of claim 8, wherein the information includes one or more of a synopsis for the associated trailer from the subset of the ranked plurality of content, reviews for the associated trailer from the subset of the ranked plurality of content, cast information for the associated trailer from the subset of the ranked plurality of content, or related media for the associated trailer from the subset of the ranked plurality of content.

10. The non-transitory computer-readable storage medium of claim 5, wherein the media content is further configured to present a list of titles that correspond to a certain set of the subset of the ranked plurality of content.

11. The non-transitory computer-readable storage medium of claim 5, wherein determining the score for each piece of content of the plurality of content is further based at least in part on time information identifying a time of a day associated with the session.

12. A computer system comprising:

a memory configured to store computer-executable instructions; and a processor in communication with the memory configured to execute the computer-executable instructions to at least:

receive click stream data from interactions with a content streaming platform during a session with the content streaming platform;

obtain historical click stream data from a plurality of users interacting with the content streaming platform during a plurality of historical sessions with the content streaming platform;

determine a score for each piece of content of a plurality of content offered by the content streaming platform based at least in part on the click stream data and the historical click stream data, the score representing a probability of consuming each piece of content during the session, each piece of content having an associated trailer;

rank the plurality of content based at least in part on the score for each piece of content;

generate media content that includes a portion of the associated trailer from a subset of the ranked plurality of content based at least in part on the score for each piece of content of the subset of the ranked plurality of content, a user interface associated with the content streaming platform configured to present, sequentially, the portion of the associated trailer of the media content;

determine a particular portion of the associated trailer from each piece of content of the subset of the ranked plurality of content based at least in part on the click stream data and the historical click stream data, the particular portion being of a duration less than an entire duration of each piece of content or the associated trailer, the plurality of content including the particular portion; and update the ranking of the plurality of content based at least in part on updated click stream data associated with the content streaming platform during the session, the updated click stream data being updated based at least in part on one or more of searching through the plurality of content, exploring the plurality of content, or interacting with portions of the plurality of content based at least in part on input from an input/output device from a user device associated with the user interface.

13. The computer system of claim 12, wherein the processor is further configured to execute the computer-executable instructions to transmit instructions to the user device associated with the user interface to present the media content in response to receiving audio input during the session.

14. The computer system of claim 12, wherein generating the media content is initiated upon: (1) a log in of the session with the content streaming platform absent the click stream data, wherein determining the score for each piece of content is based at least in part on the historical click stream data; or (2) a number of the interactions of the click stream data exceeding a threshold.

15. The computer system of claim 12, wherein the processor is further configured to execute the computer-executable instructions to at least generate instructions to integrate, sequentially, portions of associated trailers from each piece of content of the subset of the ranked plurality of content for presentation via the user interface of the content streaming platform.

16. The computer system of claim 12, wherein the portion of the associated trailer from each piece of content of the subset of the ranked plurality of content includes associated media from a third party.

17. The computer system of claim 12, wherein the processor is further configured to execute the computer-executable instructions to transmit instructions to revert from presentation of the media content to manual exploration of the content streaming platform in response to receiving updated input via the content streaming platform.

* * * * *